United States Patent
Wang

(10) Patent No.: US 10,654,442 B2
(45) Date of Patent: May 19, 2020

(54) WEBBING ADJUSTMENT DEVICE

(71) Applicant: Liang-Hsiung Wang, Tainan (TW)

(72) Inventor: Liang-Hsiung Wang, Tainan (TW)

(73) Assignee: Liang-Hsiung Wang, Tainan (TW)

( * ) Notice: Subject to any disclaimer, the term of this patent is extended or adjusted under 35 U.S.C. 154(b) by 40 days.

(21) Appl. No.: 16/135,718

(22) Filed: Sep. 19, 2018

(65) Prior Publication Data

US 2019/0152427 A1  May 23, 2019

(30) Foreign Application Priority Data

Nov. 20, 2017  (TW) .............................. 106140151 A

(51) Int. Cl.
| | |
|---|---|
| *B60R 22/20* | (2006.01) |
| *B60R 22/26* | (2006.01) |
| *B60R 22/02* | (2006.01) |
| *B60R 22/10* | (2006.01) |
| *A44B 11/25* | (2006.01) |
| *B60R 22/19* | (2006.01) |
| *B60R 22/18* | (2006.01) |

(52) U.S. Cl.
CPC .......... *B60R 22/26* (2013.01); *A44B 11/2557* (2013.01); *B60R 22/023* (2013.01); *B60R 22/024* (2013.01); *B60R 22/105* (2013.01); *B60R 22/19* (2013.01); *B60R 22/20* (2013.01); *B60R 2022/1818* (2013.01)

(58) Field of Classification Search
CPC ..... B60R 22/26; B60R 22/023; B60R 22/024; B60R 22/105; B60R 22/19; B60R 22/20; B60R 2022/1818; B60R 22/30; B60Y 2304/05; Y10T 24/4084; Y10T 24/4019; Y10T 24/4079; A44B 11/2557; A44B 11/02; A44B 11/065; A44B 11/25
USPC ........................................................ 280/804
See application file for complete search history.

(56) References Cited

U.S. PATENT DOCUMENTS

| | | | | |
|---|---|---|---|---|
| 2,317,571 A | * | 4/1943 | White ................... | A44B 11/04 24/171 |
| 4,834,427 A | * | 5/1989 | Takada .................. | B60R 22/203 280/801.2 |
| 9,738,248 B2 | * | 8/2017 | Dingman .............. | B60R 22/201 |
| 10,493,949 B2 | * | 12/2019 | Jaradi ................... | B60R 22/202 |
| 2004/0239094 A9 | * | 12/2004 | Herrmann ............. | B60R 22/202 280/808 |
| 2009/0091115 A1 | * | 4/2009 | Bell ....................... | B60R 22/20 280/801.2 |

(Continued)

*Primary Examiner* — Paul N Dickson
*Assistant Examiner* — Hilary L Johns
(74) *Attorney, Agent, or Firm* — Withrow & Terranova, P.L.L.C.

(57) ABSTRACT

A webbing adjustment device has a cover, a frame, a slider, and a guiding ring member. The frame is up and down moveably disposed in the cover. The slider is located in the cover, is moveably disposed in a body of the frame, and has a through slot formed through the slider. Webbing inserted through the through slot is locked or unlocked by a relative motion between the frame and the slider. The guiding ring member is detachably disposed on the cover, and has a guiding ring and a positioning element connected to the guiding ring. The webbing is inserted through the guiding ring. The cover is detachably hung on the guiding ring. The webbing adjustment device can lock the webbing automatically by the tension of the webbing.

18 Claims, 13 Drawing Sheets

(56) References Cited

U.S. PATENT DOCUMENTS

2017/0267209 A1\* 9/2017 Wang ...................... B60R 22/10
2018/0050657 A1\* 2/2018 Wang ..................... A44B 11/10

\* cited by examiner

WEBBING ADJUSTMENT DEVICE

This application claims the benefit of Taiwan Patent Application No. 106140151, filed on Nov. 20, 2017, the entire contents of which are incorporated herein by reference.

BACKGROUND OF THE INVENTION

Field of the Invention

The present invention relates to a webbing adjustment device, and more particularly to a webbing adjustment device to adjust a height of an upper area of a three-point seat belt system of a vehicle.

Description of Related Art

For protecting every occupant in a vehicle, each vehicle has to install a seat belt system. In general, a retractor of the seat belt system is disposed on a support pillar in the vehicle and is located beside a seat in the vehicle. A webbing of the seat belt system is pulled out from the retractor of the seat belt system. The webbing of the seat belt system is passed through a guiding ring of the seat belt system, and then the webbing is obliquely passed the front of the occupant's torso. A tongue mounted around the webbing is inserted into a buckle mounted on the seat of the vehicle. A section of the webbing passes through the tongue and extends to a side of the seat near the retractor to form a three-point seat belt system. The body of the occupant in the vehicle is restrained on the seat in the vehicle by the webbing.

In a conventional three-point seat belt system, when the webbing is fastened tightly, the height of the webbing near the shoulder of the occupant cannot be adjusted. In emergency, the neck of the occupant may be slashed by the webbing. The height of the webbing can be adjusted by a height adjustment device for the webbing. Therefore, with increasing awareness on vehicle safety, the height adjustment device for the webbing of the seat belt system is necessary.

A conventional height adjustment device for the webbing of the seat belt system is adapted to a specific vehicle and has some defects, such as complex structure, short range of adjustment, multi-step adjustment, and complicated operation. Thus, it is necessary to invent a simplified, convenient, and useful height adjustment device to adjust the height of the webbing near the shoulder of the occupant in the vehicle.

To overcome the shortcomings, the present invention provides a webbing adjustment device for a seat belt system to mitigate or obviate the aforementioned problems.

SUMMARY

The objective of the invention is to provide a webbing adjustment device that can solve the problems of the conventional height adjustment device including complex structure, short range of adjustment, multi-step adjustment, and complicated operation.

The webbing adjustment device is applied to connect to a webbing of a seat belt system. The webbing adjustment device has a cover, a frame, a slider, and a guiding ring member.

The cover has a base, two side plates, and a space. The base has two side surfaces, a back surface, and at least one stop portion. The back surface is formed in the base, is located between the two side surfaces of the base, and has a top section. The at least one stop portion is formed on the top section of the back surface of the base. The two side plates are respectively formed on the two side surfaces of the base, are protruded out of the back surface of the base, and are opposite to each other. Each one of the two side plates has a top surface, a bottom surface, an inner surface, a guiding groove, a first retaining portion, a connecting groove, and a second retaining portion. The guiding groove is formed on the inner surface of the side plate, extends to the top surface of the side plate, and has a bottom. The first retaining portion is formed on the inner surface of the side plate and is located at the bottom of the guiding groove. The connecting groove is formed on the inner surface of the side plate, extends to the bottom surface of the side plate, and has a top. The second retaining portion is formed on the inner surface of the side plate and is located at the top of the connecting groove. The space is formed in the cover adjacent to the back surface of the base and is located between the two side plates. The back surface of the base faces the space of the cover. The inner surface of each one of the side plates faces the space of the cover.

The frame is up and down moveably disposed in the cover, and has a bottom end, two sides, a through hole, and two longitudinal portions. The through hole is formed through the body. The two longitudinal portions are respectively formed on the two sides of the body. The two longitudinal portions are up and down slidably inserted into the guiding grooves of the two side plates, respectively. The connecting portion is formed on the bottom end of the body, and has a connecting hole formed through the connecting portion. The connecting portion is connected to a section of the webbing.

The slider is located in the cover, is moveably disposed in the body of the frame, and has a first plate portion, a second plate portion, a through portion, and a through slot. The first plate portion is located between the base and the body, and is disposed below the at least one stop portion of the base. The second plate portion is opposite to the first plate portion. The through portion is formed between the first plate portion and the second plate portion. The through slot is formed through the through portion. Another section of the webbing is inserted through the through slot. The section of the webbing inserted through the through slot is locked or unlocked by a relative motion between the frame and the slider.

The guiding ring member is detachably disposed on the cover and has a guiding ring and a positioning element. The guiding ring has two sides and a top end. The webbing is inserted through the guiding ring. The cover is detachably hung on the guiding ring. The two sides of the guiding ring are respectively inserted into the connecting grooves of the two side plates. The second retaining portion of the two side plates are hung on the guiding ring. The positioning element is connected to the top end of the guiding ring.

The webbing adjustment device is applied to the seat belt system in a vehicle. The guiding ring member is fixedly disposed on a support pillar in the vehicle and is located beside a seat in the vehicle. The webbing of the seat belt system is passed through the guiding ring of the guiding ring member. The frame and the slider moveably assembled in the cover are connected to two sections of the webbing divided by the guiding ring. When the webbing adjustment device is not in use, or a height position of a positioning point on the webbing does not need adjusting, the cover may be hung on the guiding ring to position the cover. The frame and the slider assembled in the cover are unlocked. The webbing can be pulled freely.

When the height position of a positioning point on the webbing needs adjusting, the cover is detached from the guiding ring member and is held by an occupant. The cover can move upwardly or downwardly in an intuitive way for adjusting the height position of the positioning point on the webbing. The relative motion between the frame and the slider is generated to unlock the webbing. The height position of the positioning point is adjusted steplessly. When the webbing adjustment device may be moved to a suitable position, the cover can be released. The webbing adjustment device locks the webbing automatically by the tension of the webbing for ensuring that the positioning point of the webbing is close to the height of the shoulder of the occupant. The webbing adjustment device is adapted to various types of vehicles. The webbing adjustment device is simplified in structure, easy in operation, and cost-effective in manufacture and assembly. The webbing adjustment device can be adjusted steplessly. The adjustment range of the webbing adjustment device is long. The webbing adjustment device is easy to operate and automatically locks the webbing.

The guiding ring is made of magnetic materials, and the cover has two magnets. The two magnets are respectively disposed on the two side plates for attracting the guiding ring. When the cover is hung on the guiding ring for positioning, the magnets on the cover can attract the guiding ring for increasing the positioning stability.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
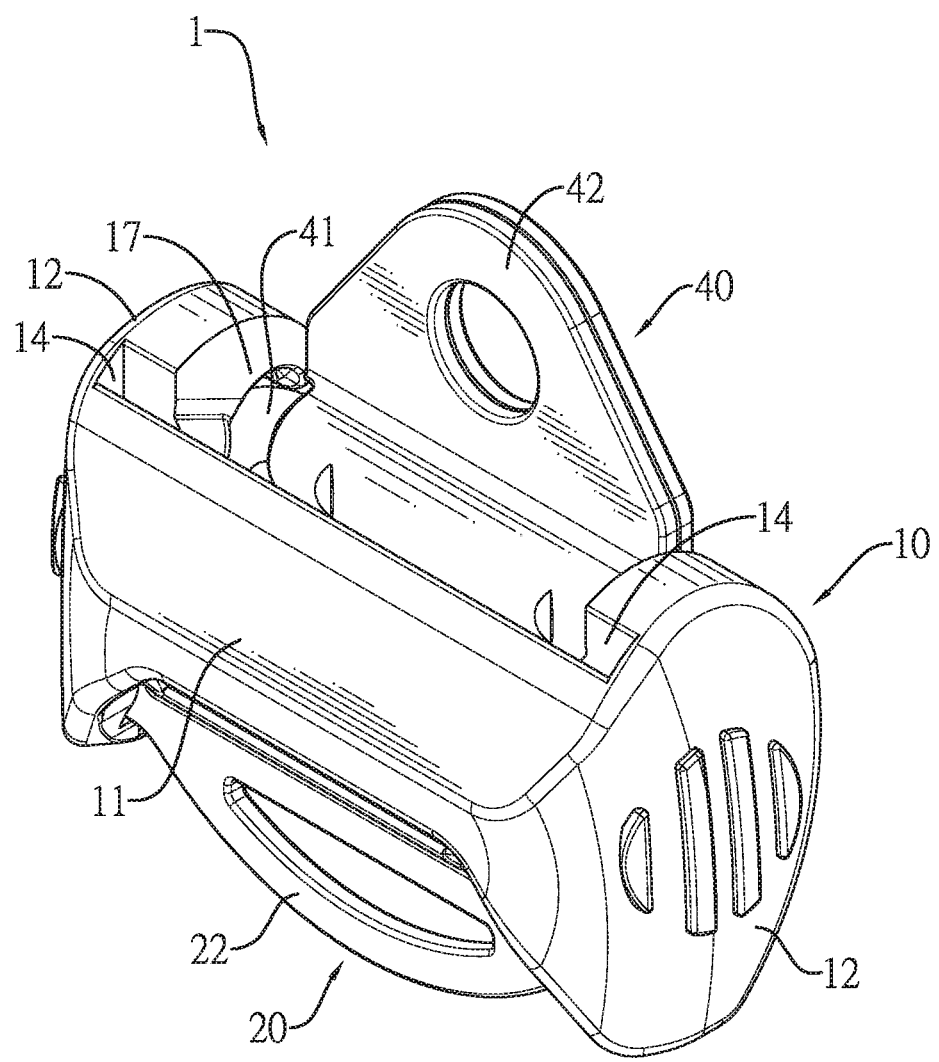
FIG. 1 is a perspective view of a first embodiment of a webbing adjustment device in accordance with the present invention.
Figure 2:
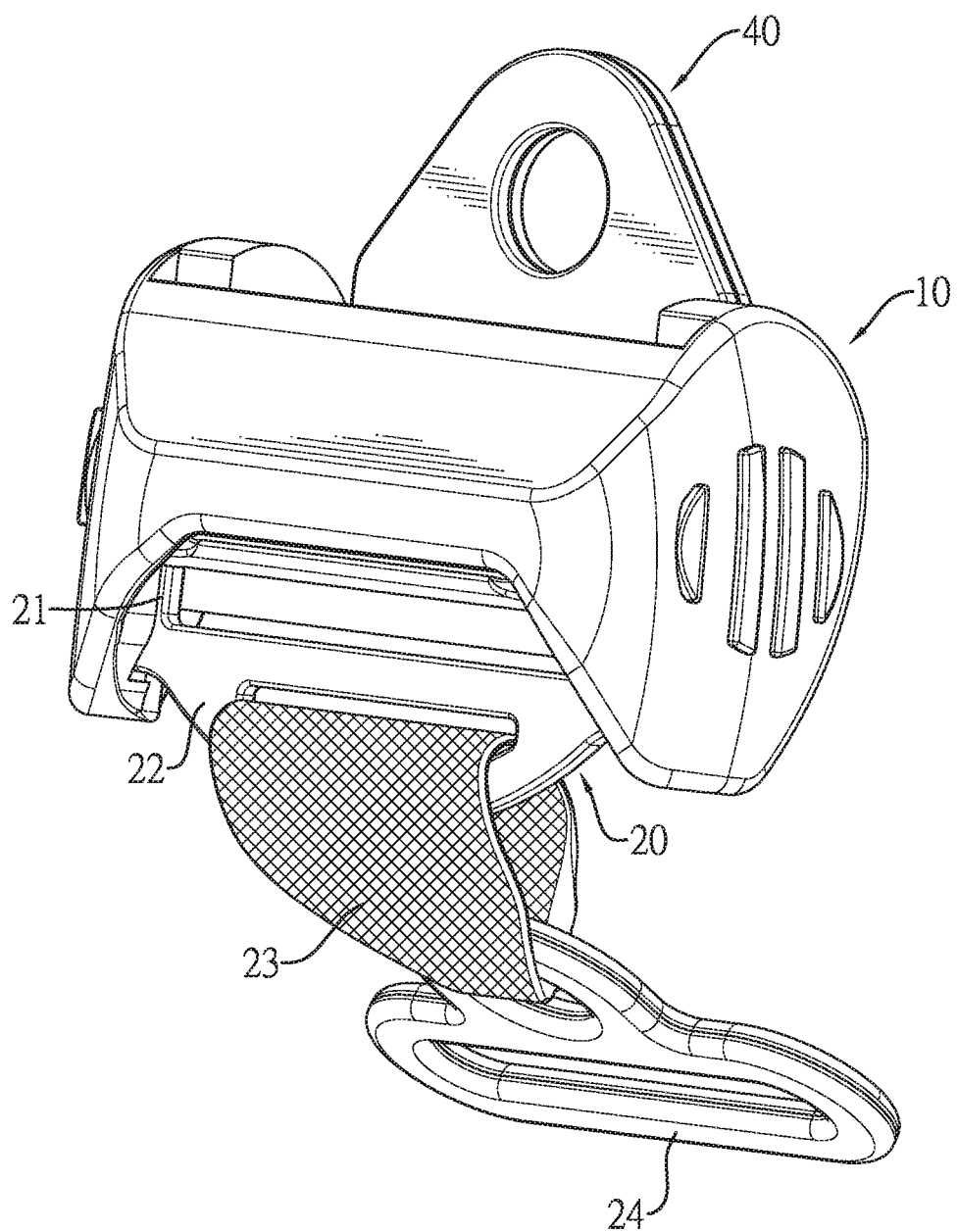
FIG. 2 is a perspective view of a second embodiment of a webbing adjustment device in accordance with the present invention, showing a connecting strap and a connecting element are disposed on the webbing adjustment device.

With reference to FIGS. 1 and 2, a first embodiment and a second embodiment of a webbing adjustment device 1 in accordance with the present invention each comprise a cover 10, a frame 20, and a slider 30. Furthermore, the second embodiment of the webbing adjustment device further comprises a guiding ring member 40.

With reference to FIGS. 3 to 6, the cover 10 has a base 11, two side plates 12, and a space 100. The base 11 has two side surfaces, a back surface 111, and at least one stop portion 13. The back surface 111 is formed in the base 11, is located between the two side surfaces of the base 11, and has a top section. The at least one stop portion 13 is formed on the top section of the back surface 111 of the base 11.

The two side plates 12 are respectively formed on the two side surfaces of the base 11, are protruded out of the back surface 111 of the base 11, and are opposite to each other. Each one of the two side plates 12 has a top surface, a bottom surface, an inner surface 121, a guiding groove 14, a first retaining portion 15, a connecting groove 16, and a second retaining portion 17. The guiding groove 14 is formed on the inner surface 121 of the side plate 12, extends to the top surface of the side plate 12, and has a bottom. The first retaining portion 15 is formed on the inner surface 121 of the side plate 12 and is located at the bottom of the guiding groove 14. The connecting groove 16 is formed on the inner surface 121 of the side plate 12, extends to the bottom surface of the side plate 12, and has a top. The second retaining portion 17 is formed on the inner surface 121 of the side plate 12 and is located at the top of the connecting groove 16.

The space 100 is formed in the cover 10 adjacent to the back surface 111 of the base 11 and is located between the two side plates 12. The back surface 111 of the base 11 faces the space 100 of the cover 10. The inner surface 121 of each one of the side plates 12 faces the space 100 of the cover 10.

Figure 7:
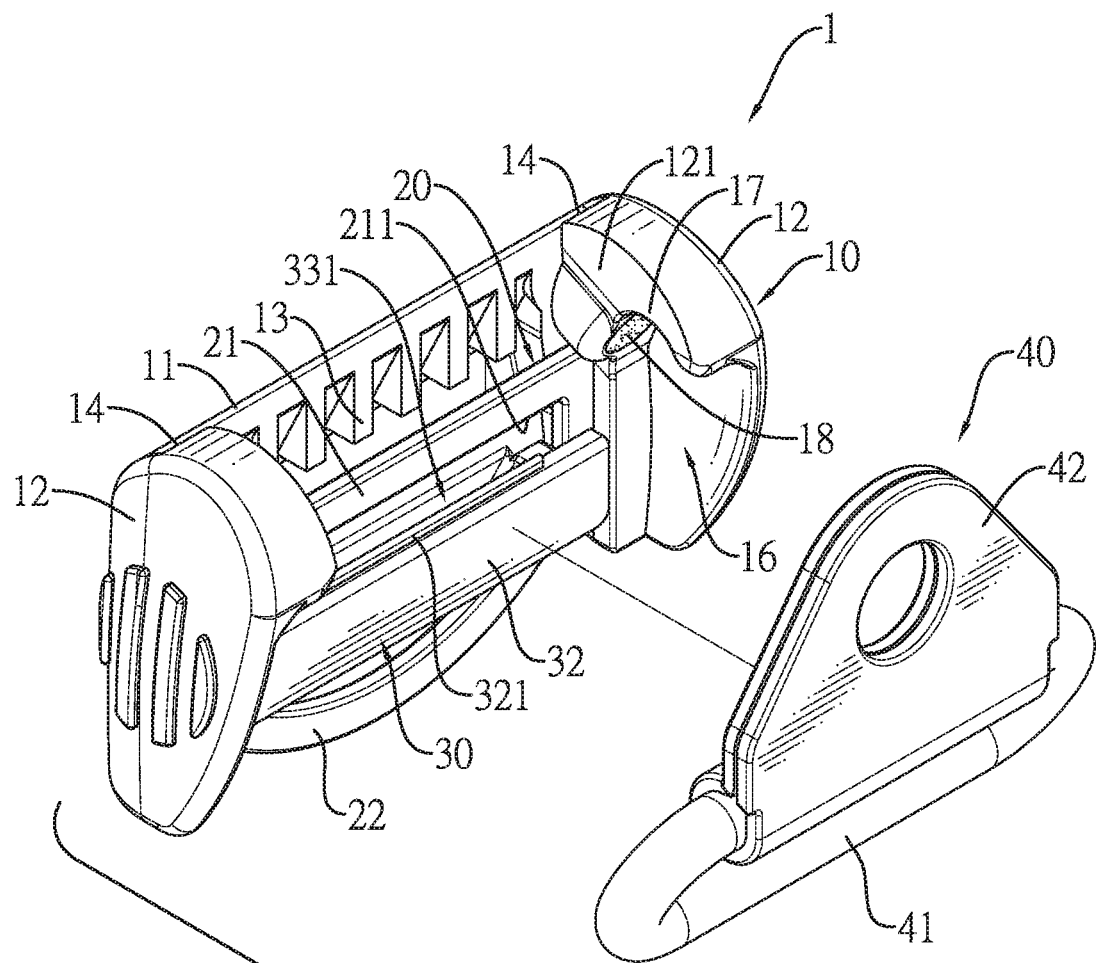
FIG. 7 is an exploded perspective view of a third embodiment of a webbing adjustment device in accordance with the present invention.

With reference to FIG. 7, the cover 10 has two magnets 18. The two magnets 18 are respectively disposed on the two side plates 12, and are disposed adjacent to the tops of the two connecting grooves 16 respectively.

With reference to FIGS. 3 to 6, the frame 20 is up and down moveably disposed in the cover 10, and has a body 21 and a connecting portion 22. The body 21 is up and down moveably disposed in the cover 10, and has a bottom end, two sides, a through hole 211, and two longitudinal portions 212. The through hole 211 is formed through the body 21. The two longitudinal portions 212 are respectively formed on the two sides of the body 21. The two longitudinal portions 212 are up and down slidably inserted into the guiding grooves 14 of the two side plates 12 slidably, respectively, and are limited by the first retaining portions 15 of the two side plates 12. The connecting portion 22 is formed on the bottom end of the body 21 and has a connecting hole 221 formed through the connecting portion 22. The connecting hole 221 is a close-type hole and is located in the connecting portion 22. Alternatively, the connecting hole 221 is formed through the connecting portion 22 and is an open-type hole. The connecting portion 22 is connected to a section of the webbing 2.

Figure 3:
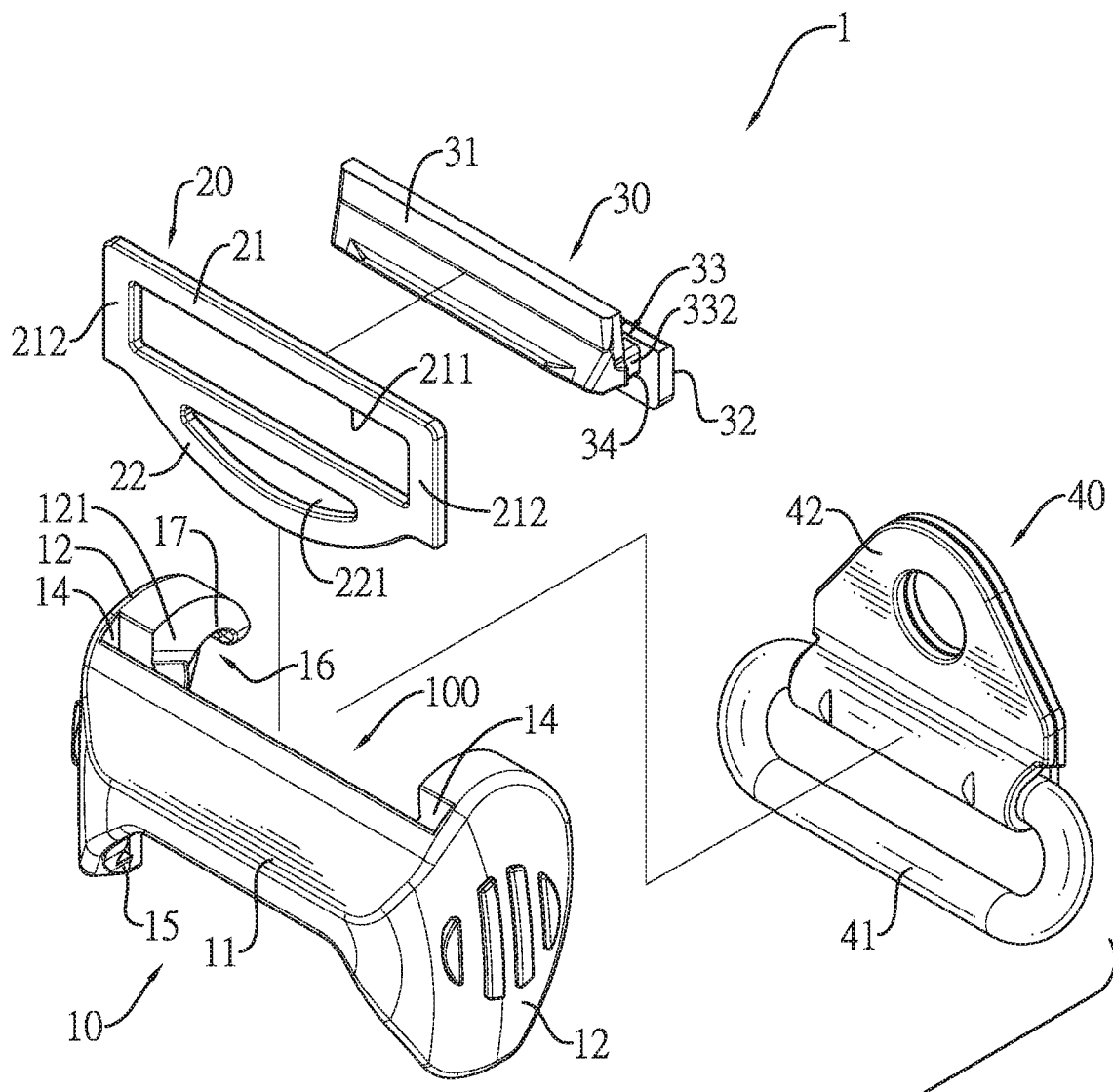
FIG. 3 is an exploded perspective view of the webbing adjustment device in FIG. 1.
Figure 4:
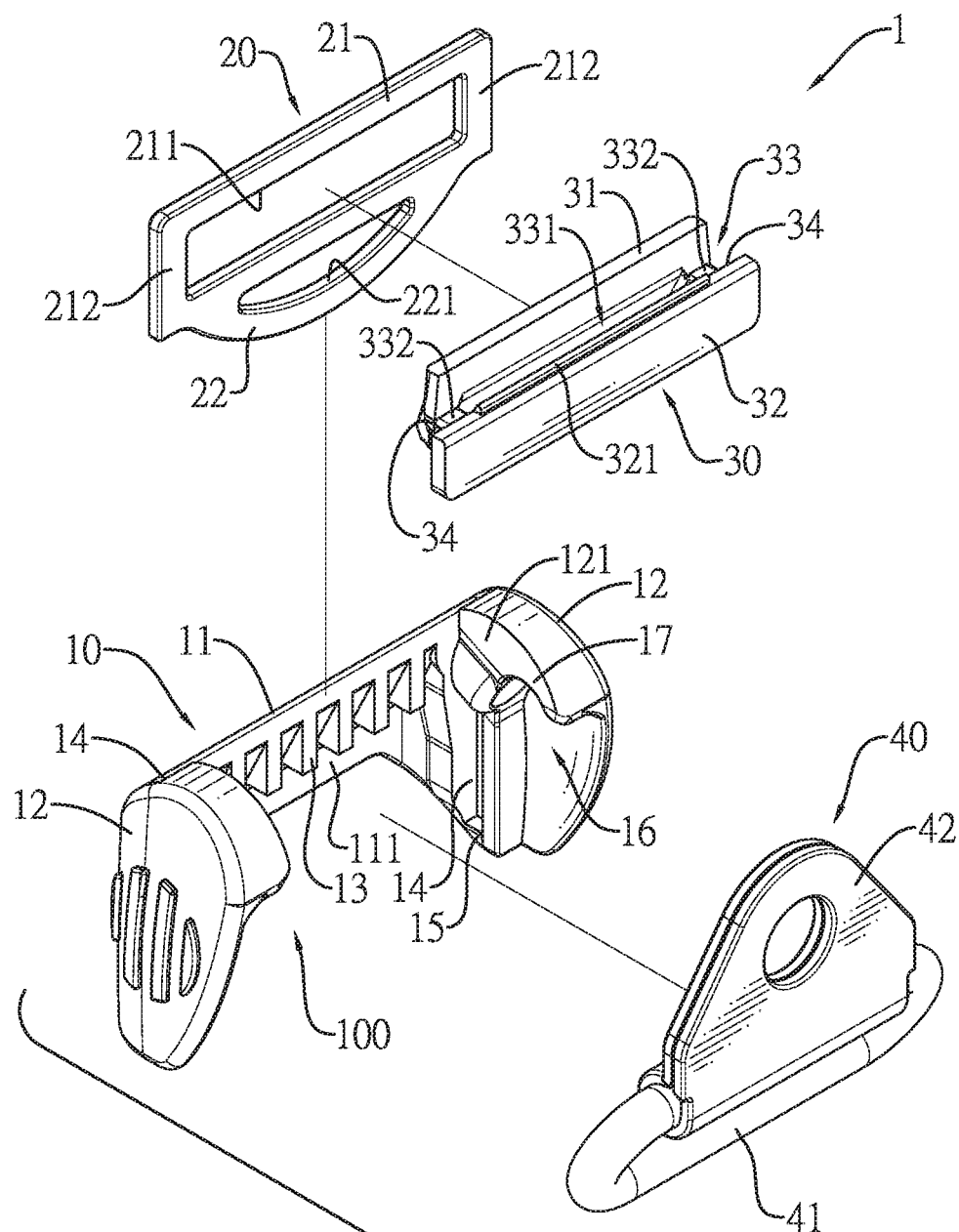
FIG. 4 is another exploded perspective view of the webbing adjustment device in FIG. 1.
Figure 5:
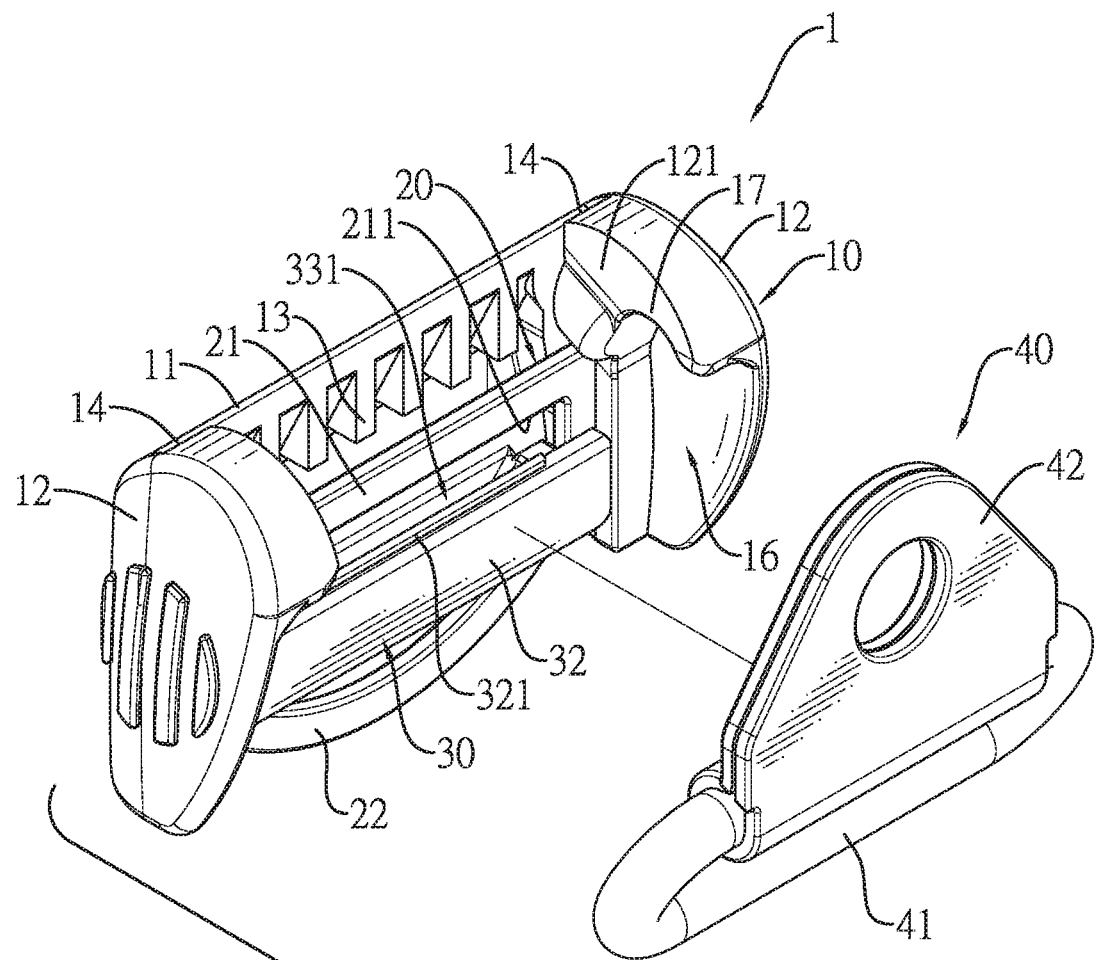
FIG. 5 is another exploded perspective view of the webbing adjustment device in FIG. 1, showing a guiding ring member is detached from the webbing adjustment device.
Figure 6:
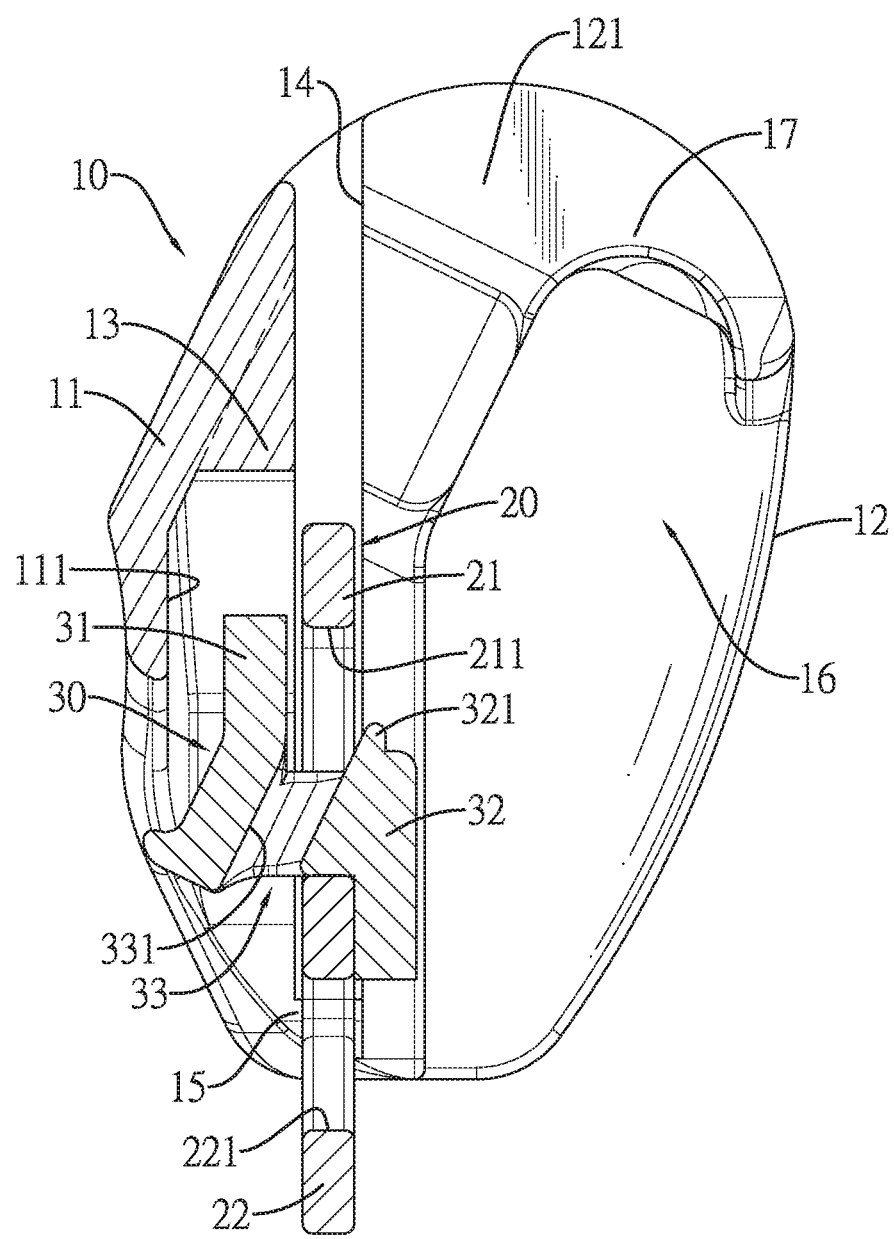
FIG. 6 is a front side view in partial section of the webbing adjustment device in FIG. 1, showing a cover, a frame, and a slider are assembled.

With reference to FIGS. 1, 3, and 4, the webbing 2 may be directly passed through the connecting hole 221 of the connecting portion 22. With reference to FIG. 2, in the second embodiment of the webbing adjustment device, the webbing adjustment device has a connecting strap 23 and a connecting element 24. The connecting strap 23 is flexible and is connected to the connecting portion 22. The connecting element 24 is connected to the connecting strap 23. The webbing 2 is inserted through the connecting element 24. Therefore, the connecting portion 22 of the frame 20 is indirectly connected to the webbing 2 by the connecting strap 23 and the connecting element 24 in series connection. The connecting strap 23 is a strap having elasticity or no elasticity.

With reference to FIGS. 3 to 6, the slider 30 is located in the space 100 of the cover 10 and is moveably disposed in the body 21 of the frame 20. The slider 30 can move relative to the frame 20. The slider 30 has a first plate portion 31, a second plate portion 32, a through portion 33, and a through slot 331. The first plate portion 31 is located between the base 11 and the body 21, and is disposed below the at least one stop portion 13 of the base 11. The second plate portion 32 is disposed opposite to the first plate portion 31. The through portion 33 is formed between the first plate portion 31 and the second plate portion 32. The through slot 331 is formed through the through portion 33.

Furthermore, the through portion 33 has two side walls 332 and two slide slots 34. Each one of the two side walls 332 is connected to the first plate portion 31 and the second plate portion 32, and has an outer surface. The through slot 331 is located between the two side walls 332. The two slide slots 34 are respectively formed on the outer surfaces of the two side walls 332 and extend from top to bottom along the side walls 332. Each one of the two slide slots 34 is located between the first plate portion 31 and the second plate portion 32.

The through portion 33 of the slider 30 is passed through the through hole 211 of the body 21 of the frame 20. The first plate portion 31 and the second plate portion 32 of the slider 30 are located at two opposite sides of the frame 20. The first plate portion 31 faces the back surface 111 of the base 11 of the cover 10. The two longitudinal portions 212 of the body 21 are respectively inserted into the two slide slots 34 of the through portion 33. The through portion 33 of the slider 30 is limited by the through hole 211 of the body 21. The slider 30 moves in a limited range defined between the body 21 of the frame 20 and the cover 10.

With reference to FIGS. 3 to 6, the first plate portion 31 has a top surface, a bottom section, and a bottom end. The second plate portion 32 has a top surface, a top section, and a top end. The top surface of the first plate portion 31 is higher than the top surface of the second plate portion 32. The through portion 33 of the slider 30 is formed between the bottom section of the first plate portion 31 and the top section of the second plate portion 32. The through slot 331 is sloped from the top end of the second plate portion 32 toward the bottom end of the first plate portion 31. Furthermore, the second plate portion 32 has a protruding portion 321. The protruding portion 321 is formed on the top surface of the second plate portion 32.

The slider 30 is assembled on the frame 20 for moving relative to the frame 20 in the cover 10. The at least one stop portion 13 formed on the top section of the back surface 111 of the base 11 of the cover 10 is located above the first plate portion 31 of the slider 30.

With reference to FIGS. 1 to 5, the guiding ring member 40 is detachably disposed on the cover 10. The guiding ring member 40 has a guiding ring 41 and a positioning element 42. The guiding ring 41 has two sides and a top end. The guiding ring 41 is made of magnetic materials and can be magnetically attracted. The positioning element 42 is connected to the top end of the guiding ring 41. The webbing 2 is inserted through the guiding ring 41. The cover 10 assembled with the frame 20 and the slider 30 is detachably hung on the guiding ring 41 from top to bottom. The two sides of the guiding ring 41 are respectively inserted into the connecting grooves 16 of the two side plates 12. The second retaining portions 17 abut against the top end of the guiding ring 41 for assembling the guiding ring 41 in the cover 10. In addition, the cover 10 assembled with the frame 20 and the slider 30 can move upwardly for detaching the cover 10 assembled with the frame 20 and the slider 30 from the guiding ring 41.

Figure 8:
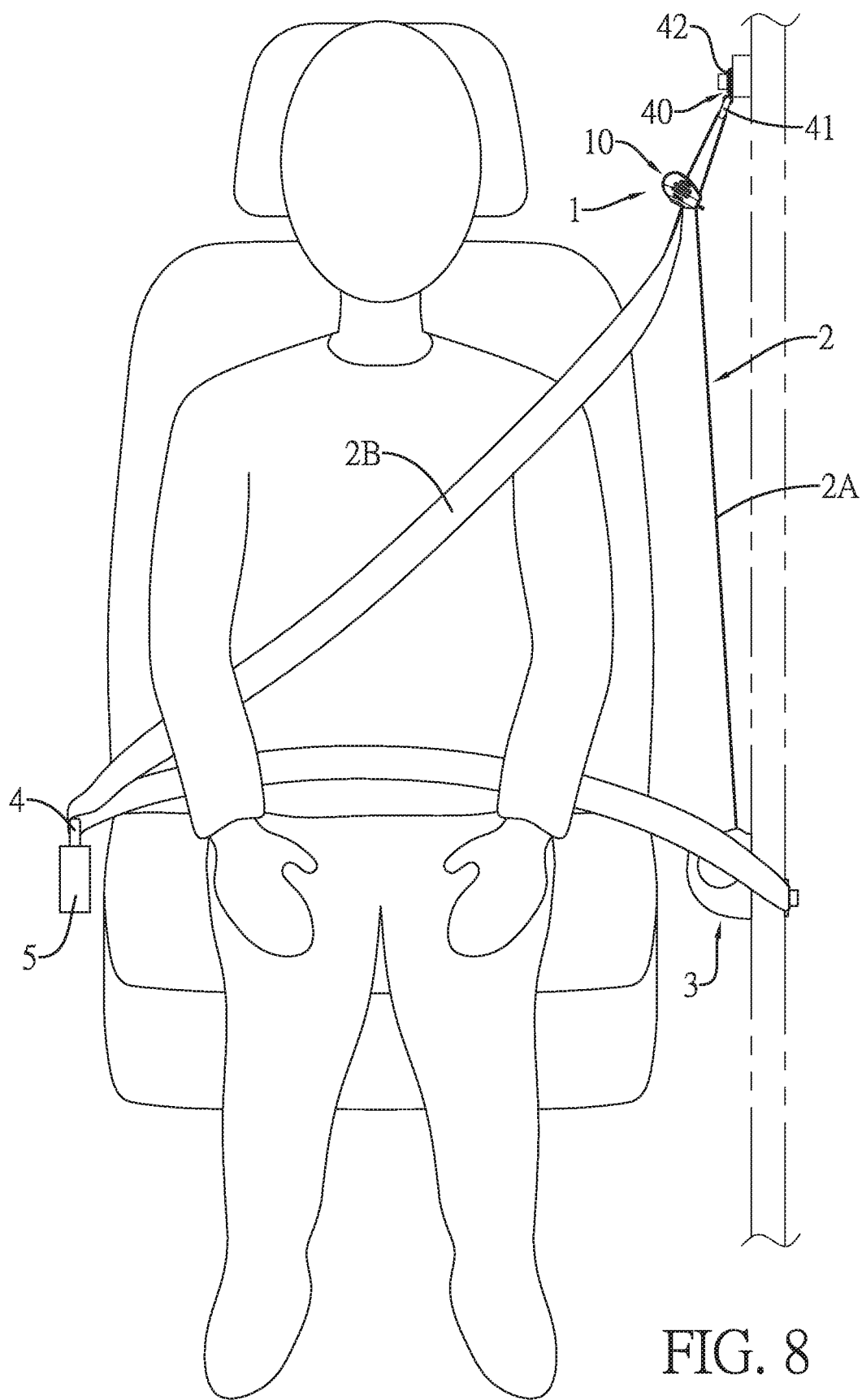
FIG. 8 is an operational front side view of the webbing adjustment device in FIG. 1, showing the webbing adjustment device is assembled on a seat belt system.
Figure 9:
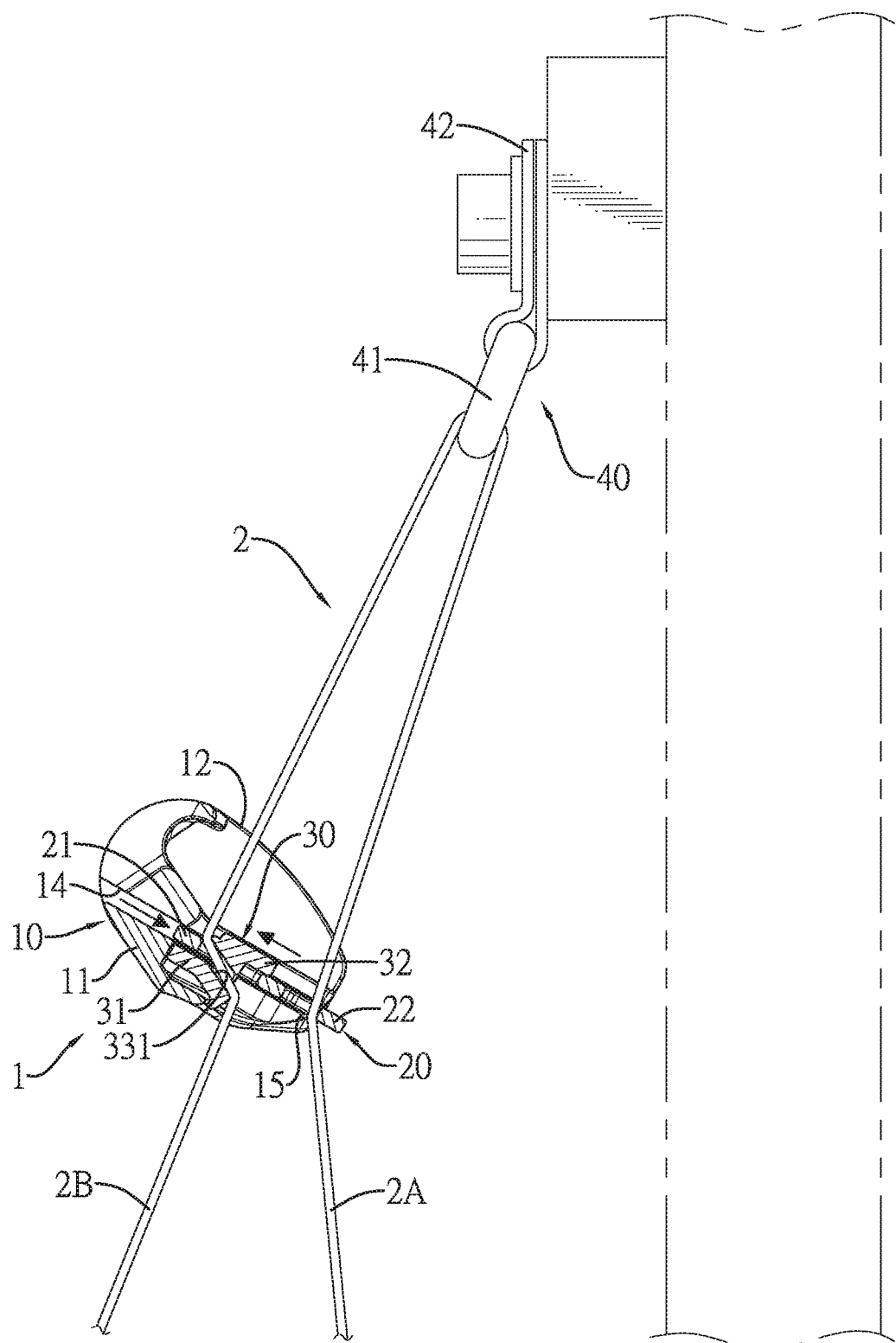
FIG. 9 is an enlarged and operational front side view in partial section of the webbing adjustment device in FIG. 8.

With reference to FIGS. 8 and 9, in the first embodiment, the webbing adjustment device 1 is applied to the seat belt system mounted in a vehicle. The positioning element 42 of the guiding ring member 40 is fixedly mounted on the pillar of the vehicle by a fixing element for fixing the webbing adjustment device beside a seat in the vehicle. The webbing 2 is pulled from a retractor 3 located beside the seat and is passed through the connecting portion 22 of the frame 20. Then, the webbing 2 is passed through the guiding ring 41 of the guiding ring member 40 and the through slot 331 of the slider 30 located in the frame 20. The webbing 2 has a front section 2A and a rear section 2B. The front section 2A of the webbing 2 is defined between the guiding ring 41 and the retractor 3. The rear section 2B of the webbing 2 is connected to the front section 2A of the webbing 2 and is sequentially passed through the guiding ring 41, the cover 10, the frame 20, the slider 3, and a tongue 4.

With reference to FIGS. 8 and 9, an occupant sits on the seat and the webbing 2 is fastened to abut the torso of the occupant. The tongue 4 connected to the rear section 2B is inserted into a buckle 5 located beside the seat. The rear section 2B of the webbing 2 is locked or unlocked by a relative motion between the frame 20 and the slider 30. The webbing adjustment device 1 forms a positioning sliding point between the front section 2A and the rear section 2B near the guiding ring 41.

Figure 10:
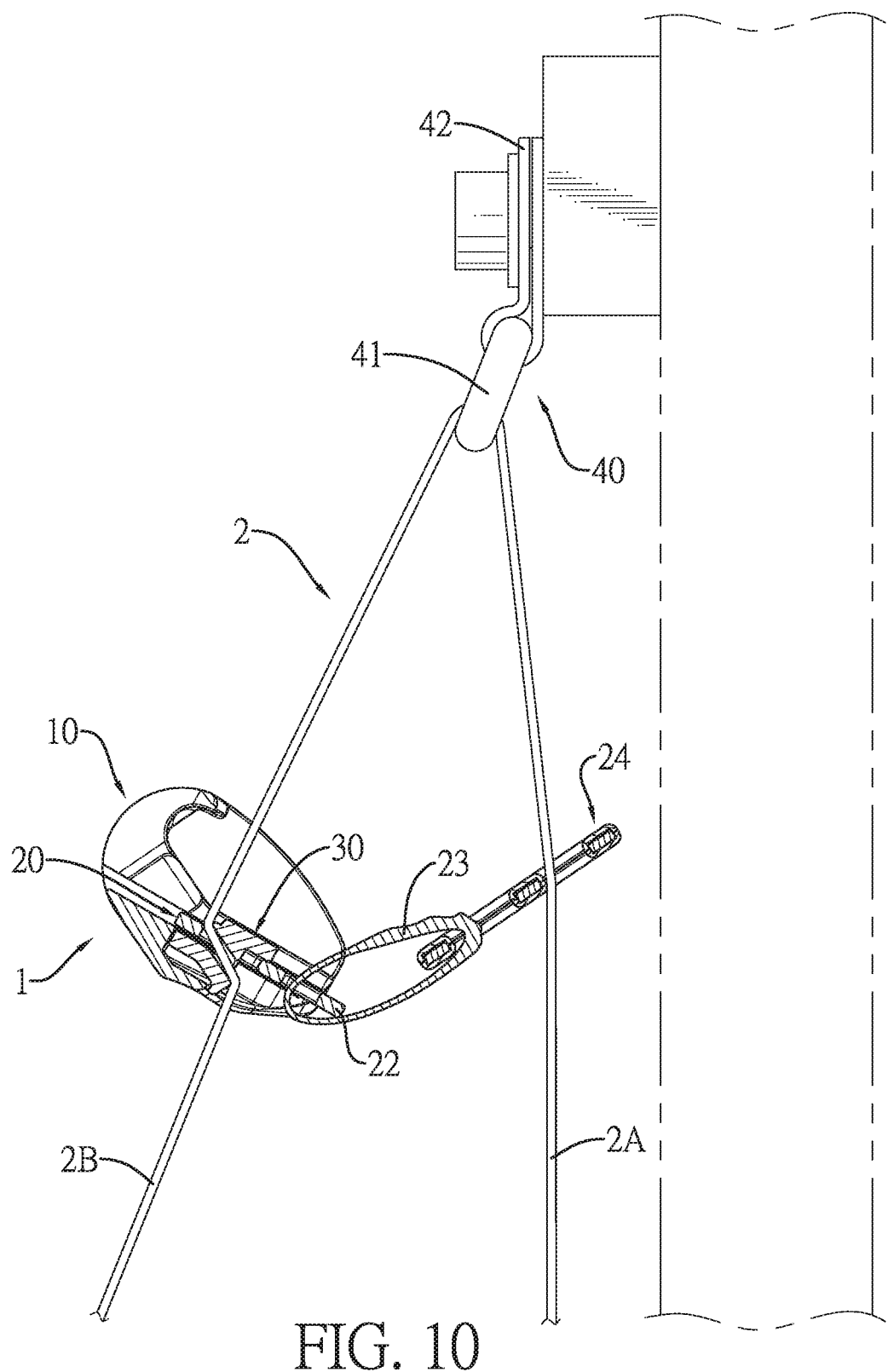
FIG. 10 is an enlarged and operational front side view in partial section of the webbing adjustment device in FIG. 2, showing the webbing adjustment device is assembled on the seat belt system.
Figure 11:
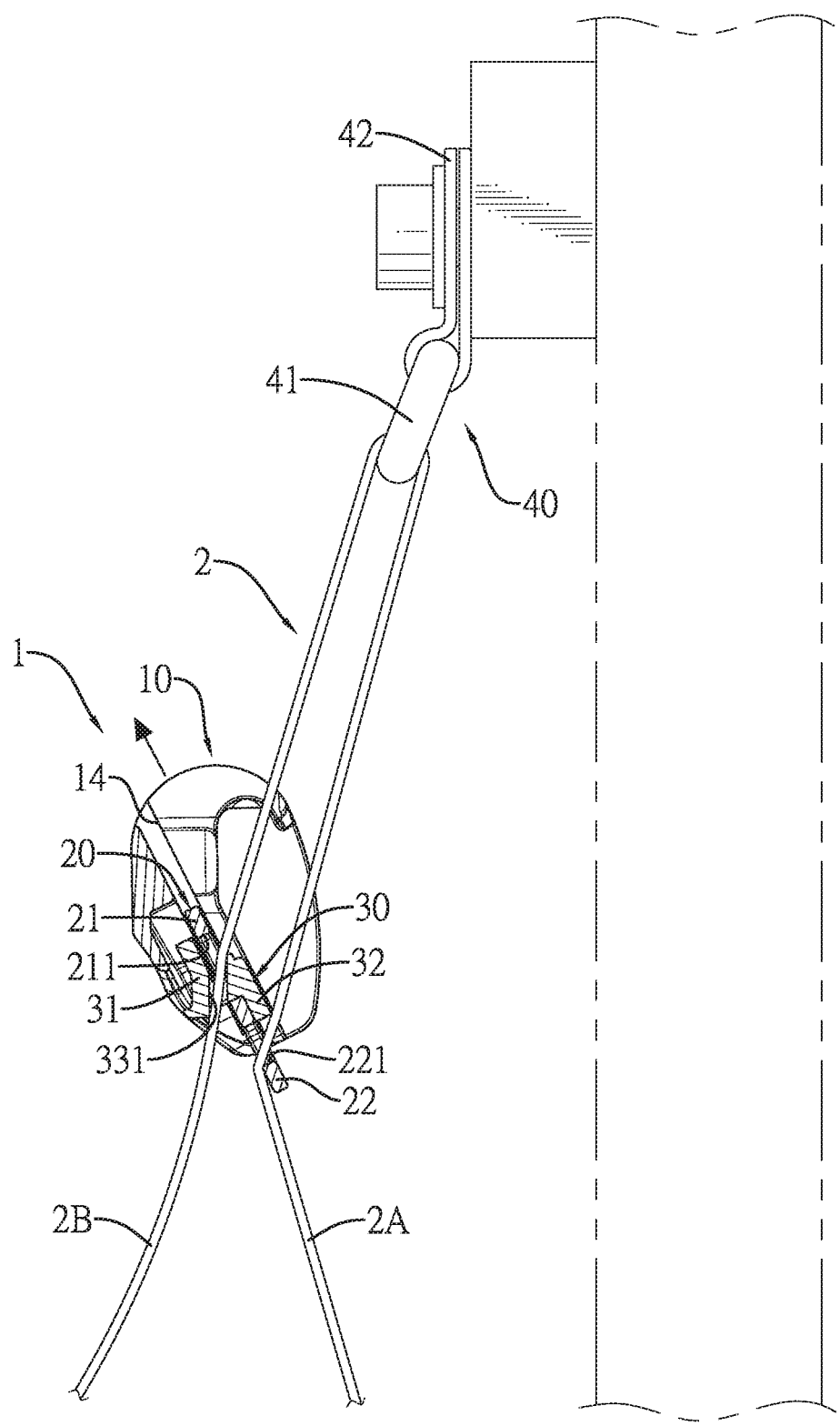
FIG. 11 is an operational front side view in partial section of the webbing adjustment device in FIG. 9, showing the webbing adjustment is in an unlocked state.

With reference to FIGS. 9 to 11, a height of a positioning point of the webbing adjustment device 1 on the webbing 2 can be adjusted by the occupant. The cover 10 can be held by one hand of the occupant for driving the frame 20 or the slider 30. The relative motion between the frame 20 and the slider 30 is generated to unlock the rear section 2B of the webbing 2. Furthermore, the cover 10 can be pushed upwardly or pulled downwardly by the occupant with stepless adjustment. When the webbing adjustment device 1 moves to a suitable position, the webbing adjustment device 1 can be released by the occupant. Under the tension of webbing 2, the frame 20 and the slider 30 relatively move to secure the rear section 2B of the webbing 2, and the webbing adjustment device 1 generates sufficient friction to lock the webbing 2 automatically. Then, the rear section 2B of the webbing 2 between the tongue 4 and the guiding ring 41 is not allowed to move relative to the webbing adjustment device 1.

With reference to FIGS. 9 to 11, the webbing adjustment device 1 is moved upward by the occupant to adjust the height of the webbing adjustment device 1. The cover 10 is pushed upward by the occupant. The frame 20 is pushed upward by the first retaining portions 15 of the two side plates 12 of the cover 10. The cover 10 drives the frame 20 to move upward relative to the slider 30. The detachment of the cover 10 is avoided. Furthermore, the frame 20 and the slider 30 do not generate sufficient force to secure the rear section 2B of the webbing 2. The webbing adjustment device 1 can be moved upward relative to the rear section 2B of the webbing 2.

Figure 12:
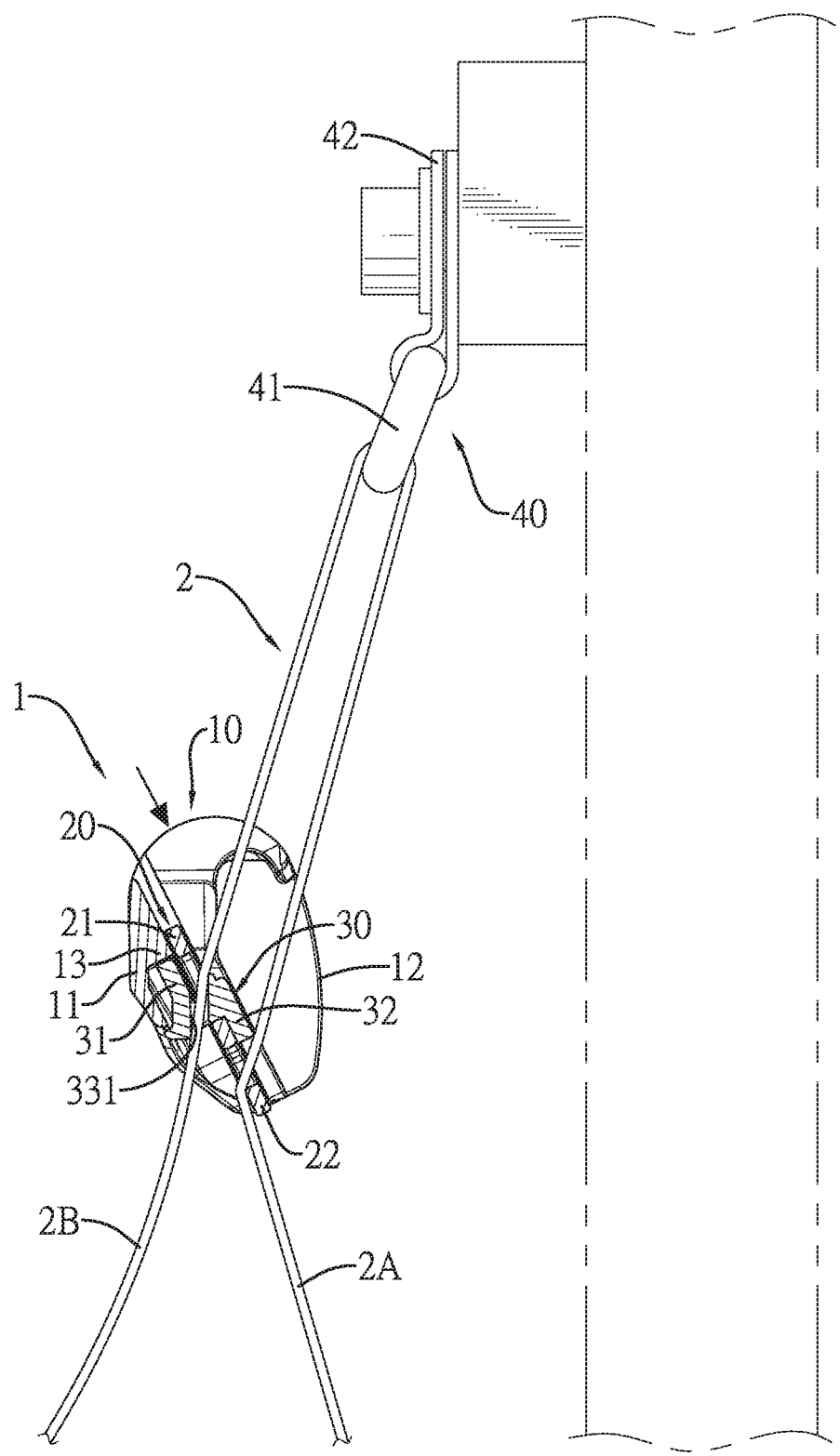
FIG. 12 is an operational front side view in partial section of the webbing adjustment device in FIG. 9, showing the webbing adjustment device moves downwardly.

With reference to FIG. 12, the webbing adjustment device 1 is moved downwardly by the occupant to adjust the height of the webbing adjustment device 1. The cover 10 is pulled downwardly by the occupant. The slider 30 is pressed downward by the at least one stop portion 13 of the base 11 of the cover 10. The slider 30 is moved downward relative to the frame 20 by the cover 10. Furthermore, the frame 20 and the slider 30 do not generate sufficient force to secure the rear section 2B of the webbing 2. The webbing adjustment device 1 can be moved downward relative to the rear section 2B of the webbing 2.

With reference to FIG. 12, after the height of the webbing adjustment device 1 is adjusted to position, the cover 10 is released by the occupant. Under the tension of the webbing 2, the frame 20 and the slider 30 relatively move to secure the rear section 2B of the webbing 2, and the webbing adjustment device 1 generates sufficient friction to lock the rear section 2B of the webbing 2 automatically. The rear section 2B of the webbing 2 between the tongue 4 and the guiding ring 41 is not allowed to move relative to the webbing adjustment device 1.

Figure 13:
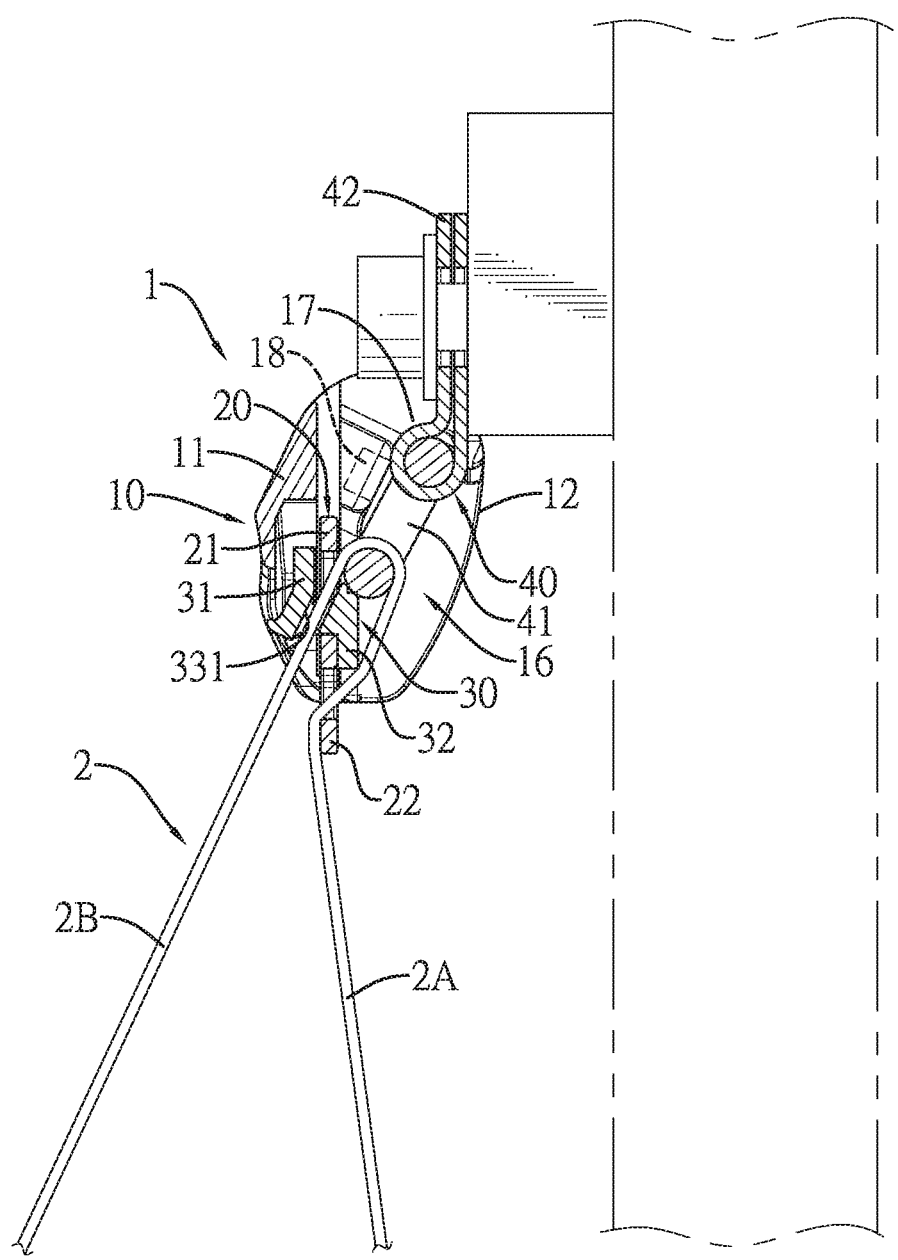
FIG. 13 is an operational front side view in partial section of the webbing adjustment device in FIG. 9, showing the cover is assembled on a guiding ring member.

With reference to FIG. 13, when the webbing adjustment device 1 is not in use, the cover 10 may be hung on the guiding ring 41 to position the cover 10 on the guiding ring 41. The frame 20 and the slider 30 assembled in the cover 10 are unlocked relative to the webbing 2. The webbing 2 can be pulled freely. With reference to FIG. 13, the magnets 18 on the two side plates 12 of the cover 10 can attract the guiding ring 41 having magnetic conductivity for increasing the positioning stability.

With reference to FIG. 10, in an operation of the second embodiment of the webbing adjustment device, the connecting portion 22 of the frame 20 is connected to the connecting element 24 by the connecting strap 23 having flexibility. The webbing 2 is pulled from the retractor 3 located beside the seat and is passed through the connecting element 24. Then, the webbing 2 is passed through the guiding ring 41 of the guiding ring member 40 and the through slot 331 of the slider 30 located in the frame 20. The assembly and the operation of the second embodiment of the webbing adjustment device are substantially identical with those of the first embodiment and detailed descriptions thereof are omitted.

Accordingly, the webbing adjustment device 1 is applied to the seat belt system and is located between the front section 2A and the rear section 2B below the guiding ring 41. The rear section 2B can pass through the webbing adjustment device 1. The positioning point of the webbing 2 near the guiding ring member 40 is restricted by the webbing adjustment device 1 for protecting the occupant's neck from slashing by the webbing 2. To adjust the height position of the positioning point, the relative motion between the frame 20 and the slider 30 is generated to unlock the webbing 2. The webbing adjustment device 1 may be moved upwardly and downwardly to a suitable position by the occupant in an intuitive way, and then can be released. The webbing adjustment device 1 locks the webbing 2 automatically at desired positioning point by the tension of the webbing 2 for ensuring that the positioning point of the webbing 2 is close to the height of the shoulder of the occupant. Therefore, the webbing is prevented from rubbing the neck of the occupant.

Furthermore, the webbing adjustment device 1 is adapted to various types of vehicles. The webbing adjustment device 1 is simplified in structure, easy in operation, and cost-effective in manufacture and assembly. In use, the webbing adjustment device 1 has advantages that the webbing adjustment device 1 can be adjusted steplessly, the adjustment range of the webbing adjustment device 1 is long, and the webbing adjustment device 1 is easy to operate and automatically locks the webbing 2.

What is claimed is:

1. A webbing adjustment device being applied to connect to a webbing of a seat belt system, the webbing adjustment device comprising:
    a cover having
        a base having
            two side surfaces;
            a back surface formed in the base, located between the two side surfaces of the base, and having a top section; and
            at least one stop portion formed on the top section of the back surface of the base;
        two side plates respectively formed on the two side surfaces of the base, protruded out of the back surface of the base, and being opposite to each other, and each one of the two side plates having
            a top surface;
            a bottom surface;
            an inner surface;
            a guiding groove formed on the inner surface of the side plate, extending to the top surface of the side plate, and having a bottom;
            a first retaining portion formed on the inner surface of the side plate and located at the bottom of the guiding groove;
            a connecting groove formed on the inner surface of the side plate, extending to the bottom surface of the side plate, and having a top; and
            a second retaining portion formed on the inner surface of the side plate and located at the top of the connecting groove; and
        a space formed in the cover adjacent to the back surface of the base and located between the two side plates, wherein the back surface of the base faces the space of the cover, and the inner surface of each one of the side plates faces the space of the cover;
    a frame moveably disposed in the cover up and down, and having
        a body up and down moveably disposed in the cover, and having
            a bottom end;
            two sides;
            a through hole formed through the body; and
            two longitudinal portions respectively formed on the two sides of the body, wherein the two longitudinal portions are up and down slidably inserted into the guiding grooves of the two side plates respectively; and
        a connecting portion formed on the bottom end of the body and having a connecting hole formed on the connecting portion, wherein the connecting portion is connected to a section of the webbing;
    a slider located in the cover, moveably disposed in the body of the frame, and having
        a first plate portion located between the base and the body, and disposed below the at least one stop portion of the base;
        a second plate portion opposite to the first plate portion;

a through portion formed between the first plate portion and the second plate portion; and a through slot formed through the through portion, wherein another section of the webbing is inserted through the through slot, and the section of the webbing inserted through the through slot is locked or unlocked by a relative motion between the frame and the slider; and a guiding ring member detachably disposed on the cover, and having a guiding ring having two sides and a top end, wherein the webbing is inserted through the guiding ring, and the cover is detachably hung on the guiding ring, the two sides of the guiding ring are respectively inserted into the connecting grooves of the two side plates, and the second retaining portion of the two side plates are hung on the guiding ring; and a positioning element connected to the top end of the guiding ring.

2. The webbing adjustment device as claimed in claim 1, wherein the first plate portion has a top surface, a bottom section, and a bottom end, the second plate portion has a top surface, a top section, and a top end, the top surface of the first plate portion is higher than the top surface of the second plate portion, the through portion of the slider is formed between the bottom section of the first plate portion and the top section of the second plate portion, the through slot is sloped from the top end of the second plate portion toward the bottom end of the first plate portion.

3. The webbing adjustment device as claimed in claim 2, wherein the through portion has two side walls and two slide slots, each one of the two side walls is connected to the first plate portion and the second plate portion and has an outer surface, the through slot is located between the two side walls, and the two slide slots are respectively formed on the outer surfaces of the two side walls, each one of the two slide slots is located between the first plate portion and the second plate portion, and the two longitudinal portions of the body are respectively inserted into the two slide slots.

4. The webbing adjustment device as claimed in claim 1, wherein the guiding ring is made of magnetic materials, the cover has two magnets, and the two magnets are respectively disposed on the two side plates for attracting the guiding ring.

5. The webbing adjustment device as claimed in claim 2, wherein the guiding ring is made of magnetic materials, the cover has two magnets, and the two magnets are respectively disposed on the two side plates for attracting the guiding ring.

6. The webbing adjustment device as claimed in claim 3, wherein the guiding ring is made of magnetic materials, the cover has two magnets, and the two magnets are respectively disposed on the two side plates for attracting the guiding ring.

7. The webbing adjustment device as claimed in claim 1, wherein the webbing is inserted through the connecting hole of the connecting portion.

8. The webbing adjustment device as claimed in claim 2, wherein the webbing is inserted through the connecting hole of the connecting portion.

9. The webbing adjustment device as claimed in claim 3, wherein the webbing is inserted through the connecting hole of the connecting portion.

10. The webbing adjustment device as claimed in claim 7, wherein the guiding ring is made of magnetic materials, the cover has two magnets, and the two magnets are respectively disposed on the two side plates for attracting the guiding ring.

11. The webbing adjustment device as claimed in claim 8, wherein the guiding ring is made of magnetic materials, the cover has two magnets, and the two magnets are respectively disposed on the two side plates for attracting the guiding ring.

12. The webbing adjustment device as claimed in claim 9, wherein the guiding ring is made of magnetic materials, the cover has two magnets, and the two magnets are respectively disposed on the two side plates for attracting the guiding ring.

13. The webbing adjustment device as claimed in claim 1, wherein the webbing adjustment device has a connecting strap and a connecting element, the connecting strap is flexible and is connected to the connecting portion, the connecting element is connected to the connecting strap, and the webbing is inserted through the connecting element.

14. The webbing adjustment device as claimed in claim 2, wherein the webbing adjustment device has a connecting strap and a connecting element, the connecting strap is flexible and is connected to the connecting portion, the connecting element is connected to the connecting strap, and the webbing is inserted through the connecting element.

15. The webbing adjustment device as claimed in claim 3, wherein the webbing adjustment device has a connecting strap and a connecting element, the connecting strap is flexible and is connected to the connecting portion, the connecting element is connected to the connecting strap, and the webbing is inserted through the connecting element.

16. The webbing adjustment device as claimed in claim 13, wherein the guiding ring is made of magnetic materials, the cover has two magnets, and the two magnets are respectively disposed on the two side plates for attracting the guiding ring.

17. The webbing adjustment device as claimed in claim 14, wherein the guiding ring is made of magnetic materials, the cover has two magnets, and the two magnets are respectively disposed on the two side plates for attracting the guiding ring.

18. The webbing adjustment device as claimed in claim 15, wherein the guiding ring is made of magnetic materials, the cover has two magnets, and the two magnets are respectively disposed on the two side plates for attracting the guiding ring.

* * * * *